(12) United States Patent
Lwali et al.

(10) Patent No.: US 10,793,358 B1
(45) Date of Patent: Oct. 6, 2020

(54) SPIRAL ENTRY CHUTE

(71) Applicant: Amazon Technologies, Inc., Seattle, WA (US)

(72) Inventors: Racha Lwali, Tacoma, WA (US); Andrew John Gawne, Renton, WA (US); Bruce Leardi, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/113,677

(22) Filed: Aug. 27, 2018

(51) Int. Cl.
    *B65G 21/18* (2006.01)
    *B65G 11/06* (2006.01)
    *B65G 15/02* (2006.01)

(52) U.S. Cl.
    CPC .................................. *B65G 11/063* (2013.01)

(58) Field of Classification Search
None
See application file for complete search history.

(56) References Cited

U.S. PATENT DOCUMENTS

| | | | | |
|---|---|---|---|---|
| 5,413,213 A * | 5/1995 | Golz | ........................ | A24C 5/35 198/778 |
| 6,371,275 B1 * | 4/2002 | Terrell | ................. | B65G 11/063 193/12 |
| 7,185,748 B2 * | 3/2007 | Malatesta | ............ | B65G 11/163 193/8 |
| 8,328,004 B2 * | 12/2012 | Balk | ...................... | B65G 15/10 198/370.01 |

* cited by examiner

*Primary Examiner* — Kavel Singh
(74) *Attorney, Agent, or Firm* — BakerHostetler

(57) ABSTRACT

A spiral chute assembly for moving packages from an upper level to a lower level of sort facility includes a first slide inlet and an opposing second slide inlet opposite the first slide inlet. The first slide has an outlet that is above the second slide outlet in the spiral chute. The front walls of the first and second slides are angled in the direction of the approaching package to facilitate receiving the package while moving.

20 Claims, 8 Drawing Sheets

SPIRAL ENTRY CHUTE

BACKGROUND

Modern order fulfillment facilities the handle a vast number of customer orders. In one example, a modern sort center receives packages, such as paperboard boxes and envelopes or pouches, bearing destination information, such as a nine-digit zip code. In the sort center, the packages are grouped together according to destination location and/or delivery route. For example, packages having the same zip code destination are grouped together on pallets, gaylords, or other means and then shipped together from the sort center by conventional means. The vast number of packages requires the sorting process to be fast.

Various conveyors and chutes are known are employed to move the packages within a sort center.

DETAILED DESCRIPTION OF ILLUSTRATIVE EMBODIMENTS

Figure 1:
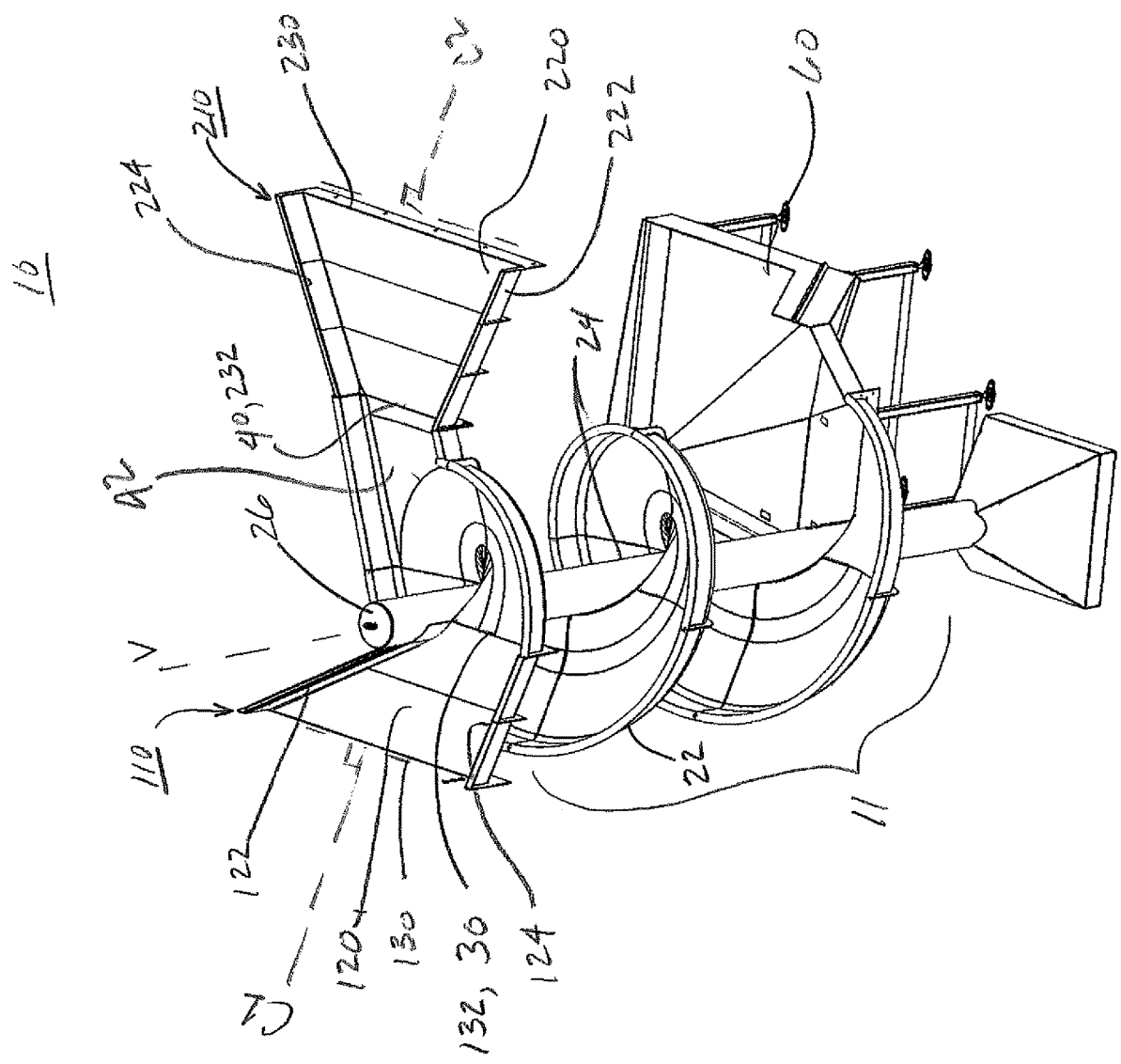
FIG. 1 is a perspective view of a package handling chute assembly with the floor removed for clarity.
Figure 2:
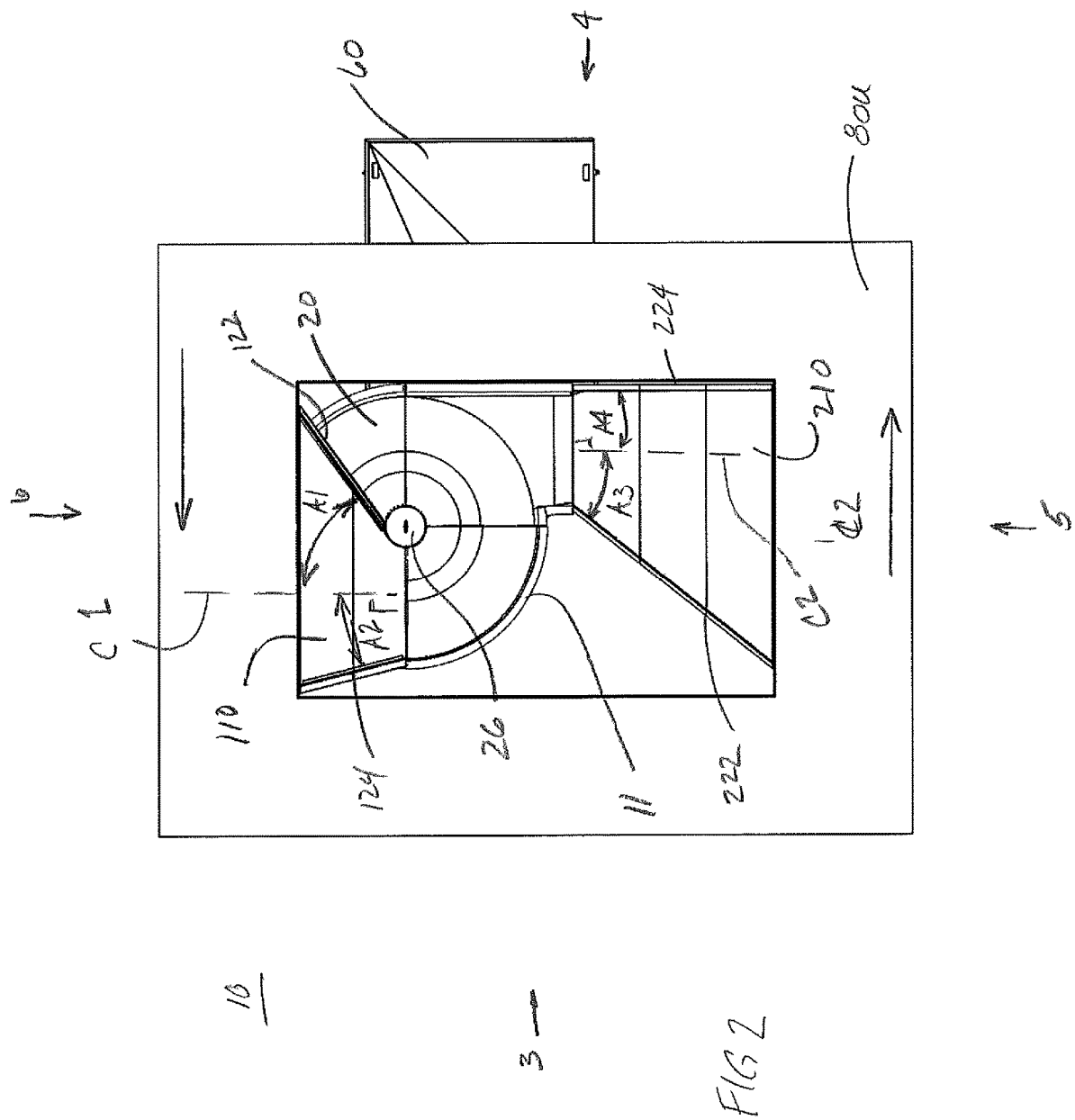
FIG. 2 is a top view of the chute assembly.
Figure 3:
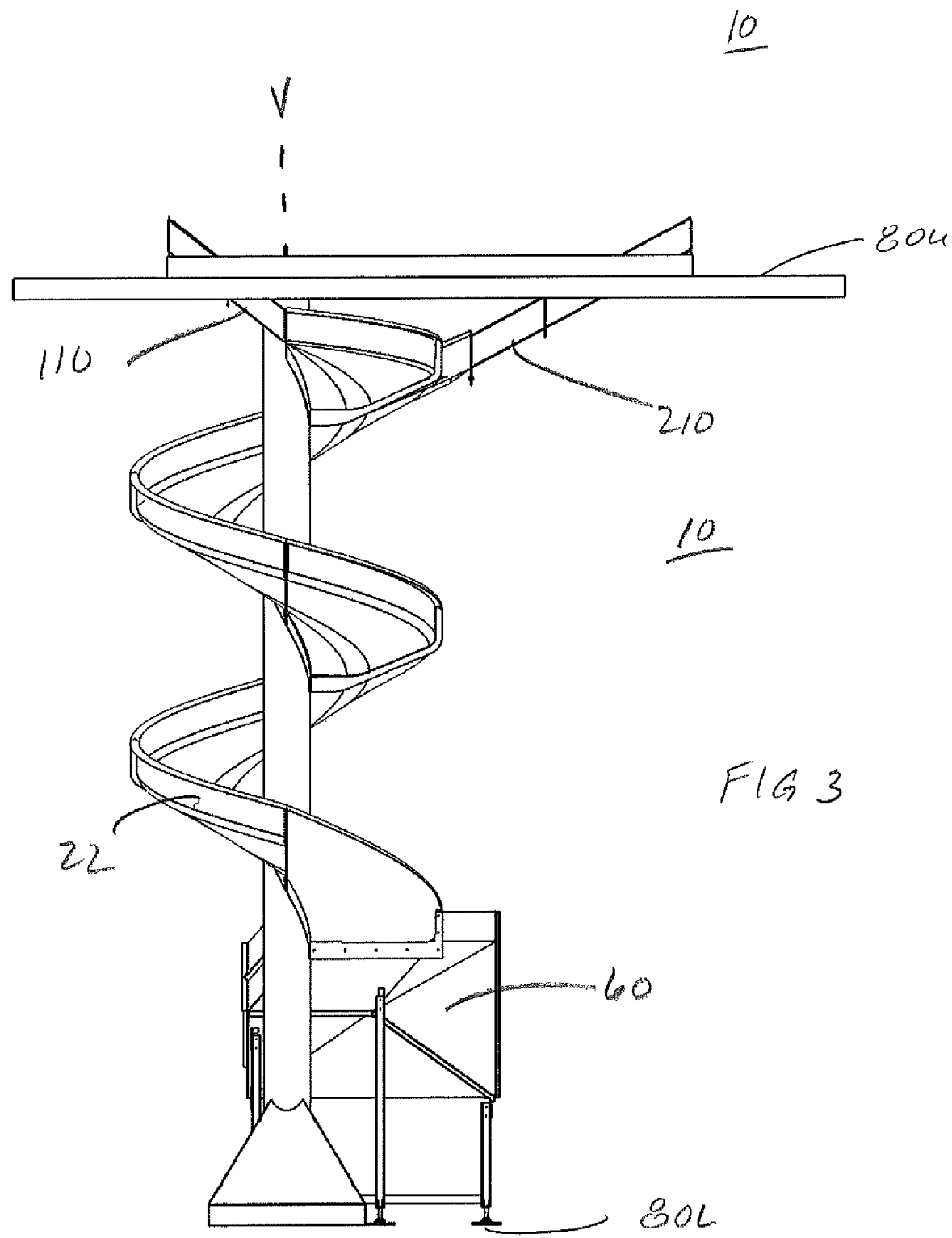
FIG. 3 is a first side view of the chute assembly from the perspective shown in FIG. 2.
Figure 4:
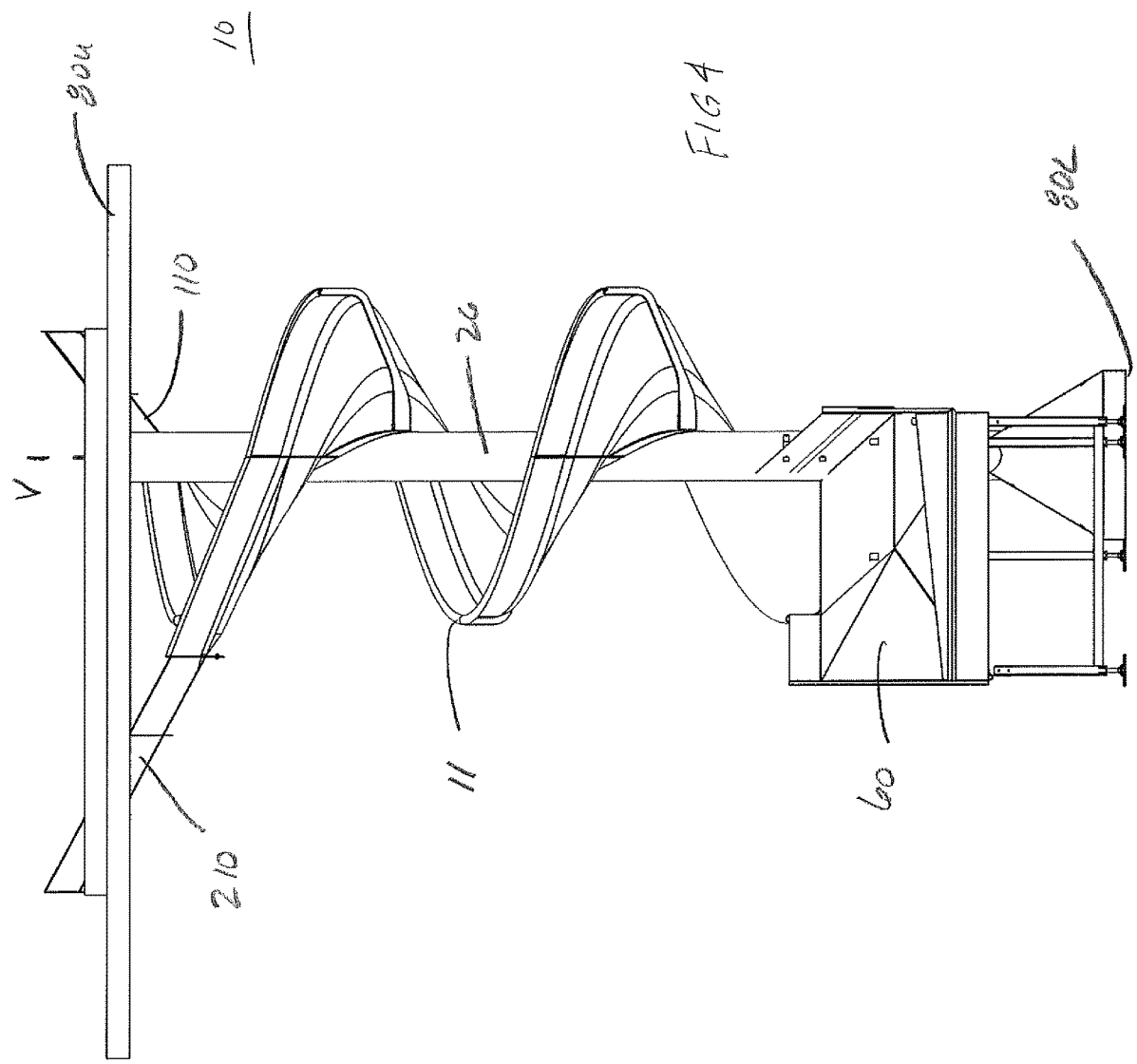
FIG. 4 is a second side view of the chute assembly from the perspective shown in FIG. 2.
Figure 5:
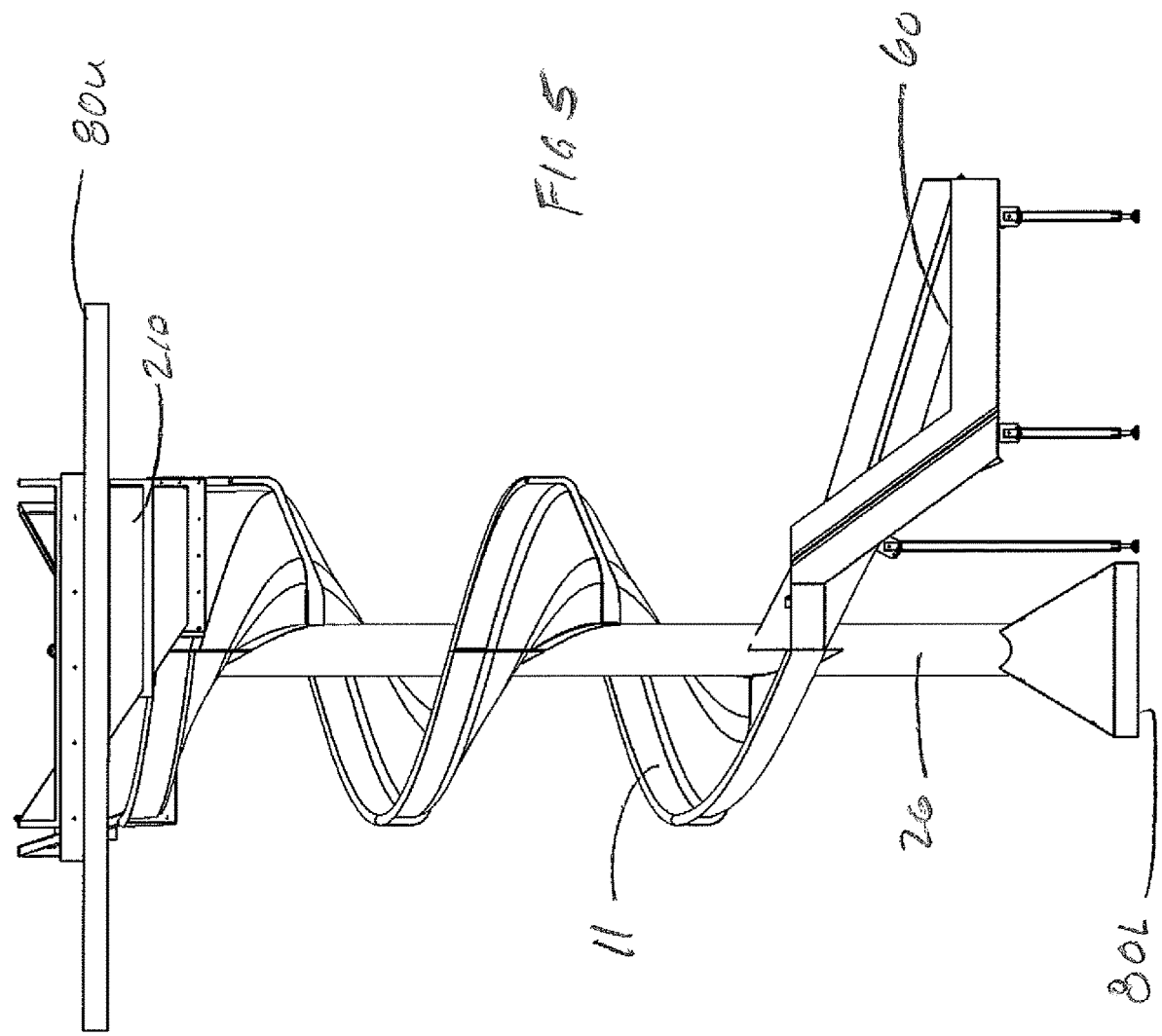
FIG. 5 is a third side view of the chute assembly from the perspective shown in FIG. 2.
Figure 6:
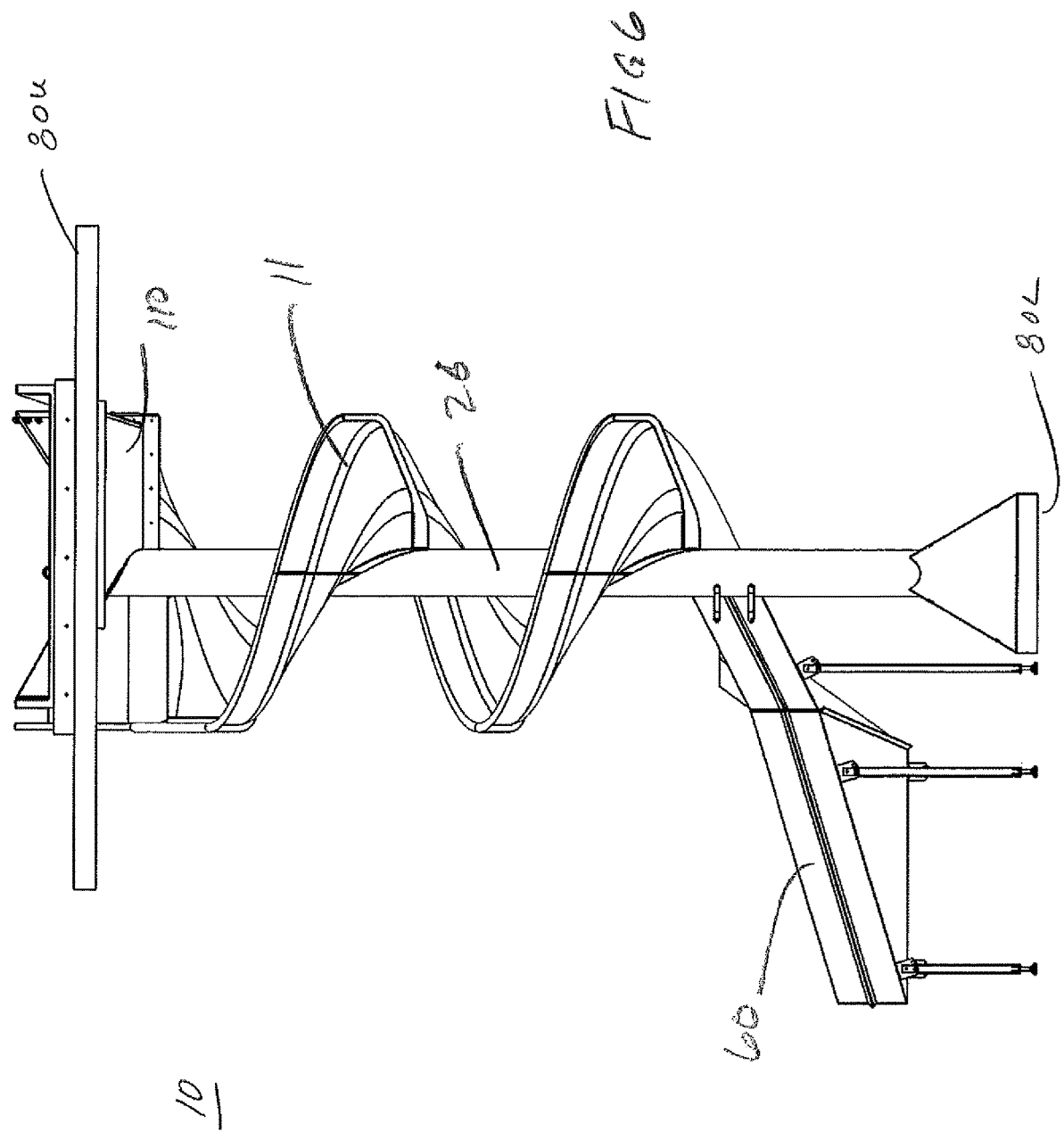
FIG. 6 is a fourth side view of the chute assembly from the perspective shown in FIG. 2.
Figure 7:
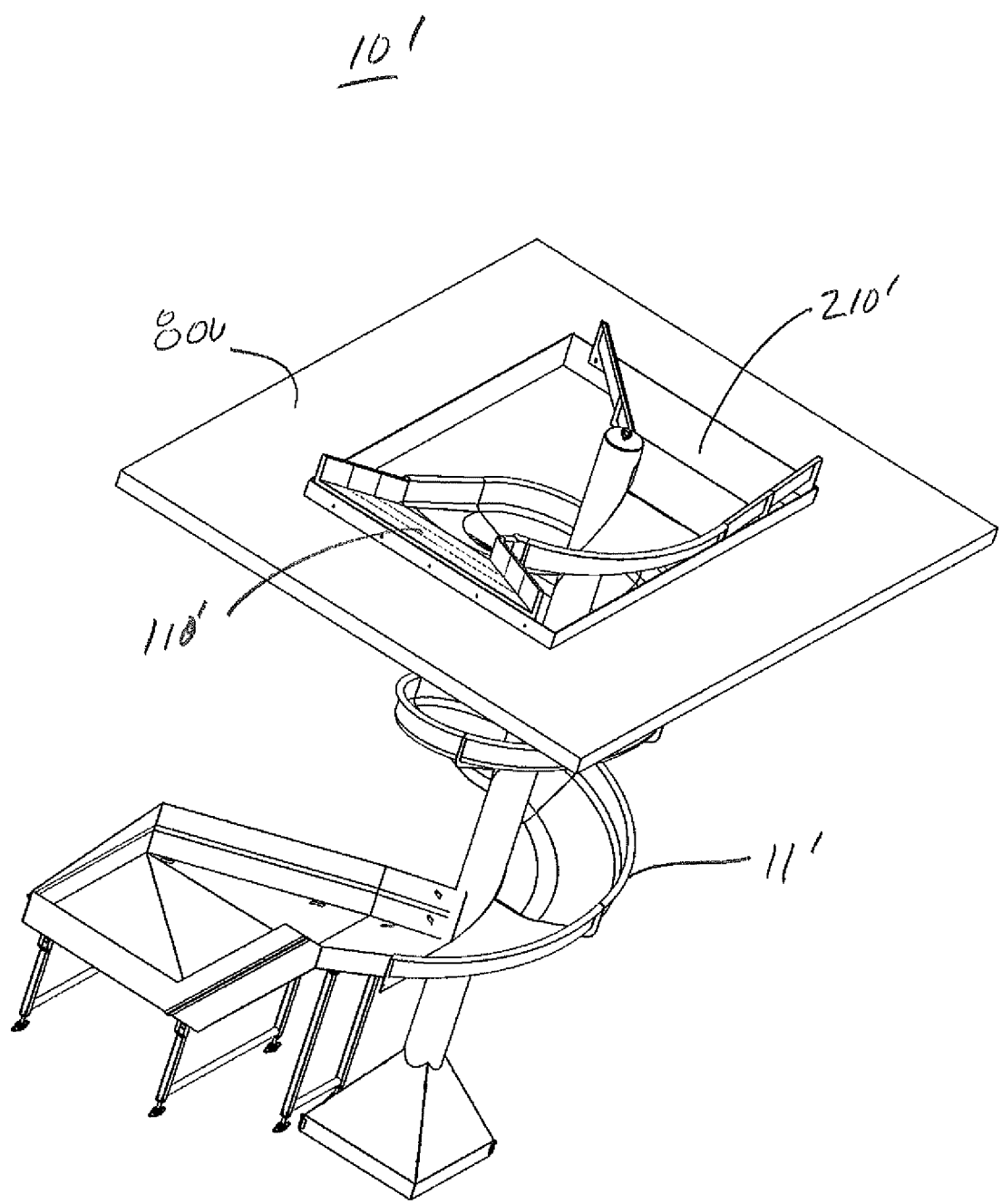
FIG. 7 is a view of a chute assembly having the opposite orientation as the chute assembly of FIG. 2.

A chute assembly is capable of receiving packages, such as boxed items or bagged items or items in a mailing envelope or pouch, at an upper level of a sort facility and guiding the packages to a lower level of the facility. Preferably the chute assembly has opposing inlets at the upper level for receiving packages moving in corridors or passage ways alongside the chute assembly. The chute assemblies may be arranged in a grid pattern of any configuration, where each chute corresponds to a specific designation, such as a nine digit zip code.

The package-handling chute assembly comprises: a first entry slide including an inlet, an outlet, an inclined bed extending between the inlet and the outlet; a second entry slide located opposite the first entry slide; the second entry structure including an inlet, an outlet, an inclined bed extending between the inlet and the outlet; a spiral chute including a first inlet corresponding to the first entry slide outlet, and a second inlet corresponding to the second entry slide outlet; the first chute inlet is located upstream of the second inlet, such that the first and second slides span different vertical distances; the chute having either a clockwise orientation and a counterclockwise orientation (viewed from above). The term "spiral chute" is used herein to refer to any chute having a curved portion to direct packages by gravity. The term "upstream" as used herein refers to a relative direction or position with respect to the movement of a package in chute assembly. For example, for two packages that are downwardly moving through the spiral chute, the second or upper package is upstream of the first or lower package.

Each one of the first entry slide and the second entry slide open outwardly to receive a package moving in a direction consistent with the chute orientation. In this regard, each one of the first entry slide and second entry slide and/or the chute first inlet axis and second inlet axis define a first inlet axis and a second inlet axis, respectively, that can be parallel. In the embodiment of the figures, the entries are opposing and the chutes are configured in a grid to enable transport means to transport packages on opposing sides of the chute assembly, preferably to an accumulation conveyor on the lower level of the facility. A direction consistent with the chute orientation is one in which a package velocity or direction has a tangential component that is the same or not opposite to the tangential component of velocity or direction of a package while it is moving in the chute.

Each slide preferably is tapered and asymmetric about the corresponding inlet axis to facilitate receipt of the moving package, which has a radial velocity component relative to a vertical centerline of the chute assembly. The rear sidewall corresponds (that is, is aligned or guides the package in the same manner) with an outer sidewall of the spiral chute. The front sidewall forms a leading angle with the first inlet axis that is greater than a trailing angle, which is formed between the rear sidewall and the first inlet axis, to facilitate receipt of the package. The second entry slide includes a front sidewall and a rear sidewall the rear sidewall corresponds with an outer sidewall of the spiral chute. The front sidewall forms a leading angle with the second inlet axis that is greater than a trailing angle, which is formed between the rear sidewall and the second inlet axis, to facilitate receipt of the package moving in the opposite direction of the package entering the first slide.

When oriented in a grid, the chute assemblies may be configured to receive packages from transport means that move packages alongside the chutes. For packages having identifying information, such as zip code information, each chute may receive packages intended for a common destination, such as a nine digit zip code area. Or packages for several destinations may be grouped together for a single chute assembly. Packages may be removed from the accumulation conveyor and placed on a pallet (for boxes) or a gaylord (for envelopes or pouches) for further transport.

Referring to the figures, a chute assembly 10 includes a spiral chute 11, a first inlet slide 110, and a second inlet slide, and an accumulation conveyor, such as a bin or slide 60. Spiral chute 11 includes a spiral body 20, an upstanding outer sidewall 22, and an upstanding inner sidewall 24. Chute 11 includes a first inlet 30, a second inlet 40, and an outlet 50 that empties on to accumulation conveyor 60. The term "accumulation conveyor" is used broadly herein to refer to structures that receive items, such as boxes, pouches, and the like" from spiral chute 11. For example, the accumulation conveyor can be a slide, another conveyor for moving the packages to another location, a fixed bin from which packages can be removed by a person or automated device, a moveable bin or gaylord that receive the packages, or other fixed or moveable receptacle for package. Preferably, chute body 20 is attached to a center post 26 that defines a vertical centerline axis V. In the embodiment of the figures, chute 11 is an 810 degree helix.

The cross sectional shape, slope, number (or total degree) or turns, turn radius, and width of chute 11; the height of sidewalls 22 and 24; and their materials may be chosen according to the parameters of the specific application, including floor height, configuration and height of the outlet accumulation conveyor or other outlet mechanism, package or other workpiece configuration and weight, desired terminal velocity, and other parameters as will be understood by persons familiar with item transport in this field. In the embodiment of the figures, chute 11 has a curved cross sectional body formed of segments of structural fiberglass.

First inlet slide 110 includes an inclined bed 120 having an upstanding front sidewall 122 and an upstanding rear sidewall 124. First slide includes an inlet 130 and an outlet 132. Bed 120 is tapered such that the opening dimension of inlet 130 is larger than the opening dimension of outlet 132. Slide outlet 132 is connected to chute first inlet 30.

Front sidewall 122 is designated as "front" because it is angled such that inlet 130 opens toward the direction of an approaching transport means that can carry a package, as described more fully below. In this regard, a first axis C1 is a horizontal line defined as a projection from the center of the chute inlet 30. Alternatively, the direction of first axis C1 may be defined as the normal to the slide first inlet 130. It is intended that the direction or orientation of axes C1 and C2 be defined by either of the two ways described above because of the possible variants of the components and their specific configurations.

Front sidewall 122 is angled relative to axis C1 by an angle A1 that is positive and is greater than the angle A2 formed between rear sidewall 124 and axis C1. The magnitude of angle A1 may be chosen according the dimensions of slide 110 and the speed of the package. In this regard, the angle A1 may be chosen to be approximately equal to the velocity vector of the package ejected from the transport means, which ejection process is explained more fully below.

In the embodiment shown in the photos, the inlet 130 has a dimension of 71 inches, and outlet 132 dimension of approximately 29.75 inches. Bed 120 is angled from a horizontal by approximately 29.5 degrees and has a vertical height of approximately 15.625 inches.

Second inlet slide 210 includes an inclined bed 220 having an upstanding front sidewall 222 and an upstanding rear sidewall 224. Second slide 210 includes an inlet 230 and an outlet 232. Bed 220 is tapered such that the opening dimension of inlet 230 is larger than the opening dimension of outlet 232. Slide outlet 232 is connected to chute second inlet 40. A transition section 42, which preferably is inclined, can be positioned between second inlet 40 and the spiraling portion of spiral chute 11.

Front sidewall 222 is designated as "front" because it is angled such that inlet 230 opens toward the direction of an approaching transport means that can carry a package, as described more fully below. In this regard, a second axis C2 is a horizontal line defined as a projection from the center of the chute inlet 40. Alternatively, the direction of first axis C2 may be defined as the normal to the slide first inlet 230. Front sidewall 222 is angled relative to axis C2 by an angle A3 that is positive and is greater than the angle A4 formed between rear sidewall 224 and axis C2. The magnitude of angle A3 may be chosen according the dimensions of slide 210 and the speed of the package. In this regard, the angle A3 may be chosen to be approximately equal to the velocity vector of the package, as explained more fully below.

In the embodiment shown in the photos, the inlet 230 has a dimension of 71 inches, and outlet 232 dimension of approximately 29.75 inches. Bed 220 is angled from a horizontal by approximately 28.2 degrees and has a vertical height of approximately 27.875 inches. Thus, second slide outlet 232 and chute second inlet 40 is below and downstream of first slide outlet 132 and chute first inlet 30. In this regard, the layout and orientation of inlets 30 and 40 aid in diminishing the risk of packages deposited into the chute assembly 10 at the same time.

First and second slides 110 and 210 may be made of any material, preferably non-static and non-magnetic material, such as stainless steel. Other materials and configurations are contemplated.

Figure 8:
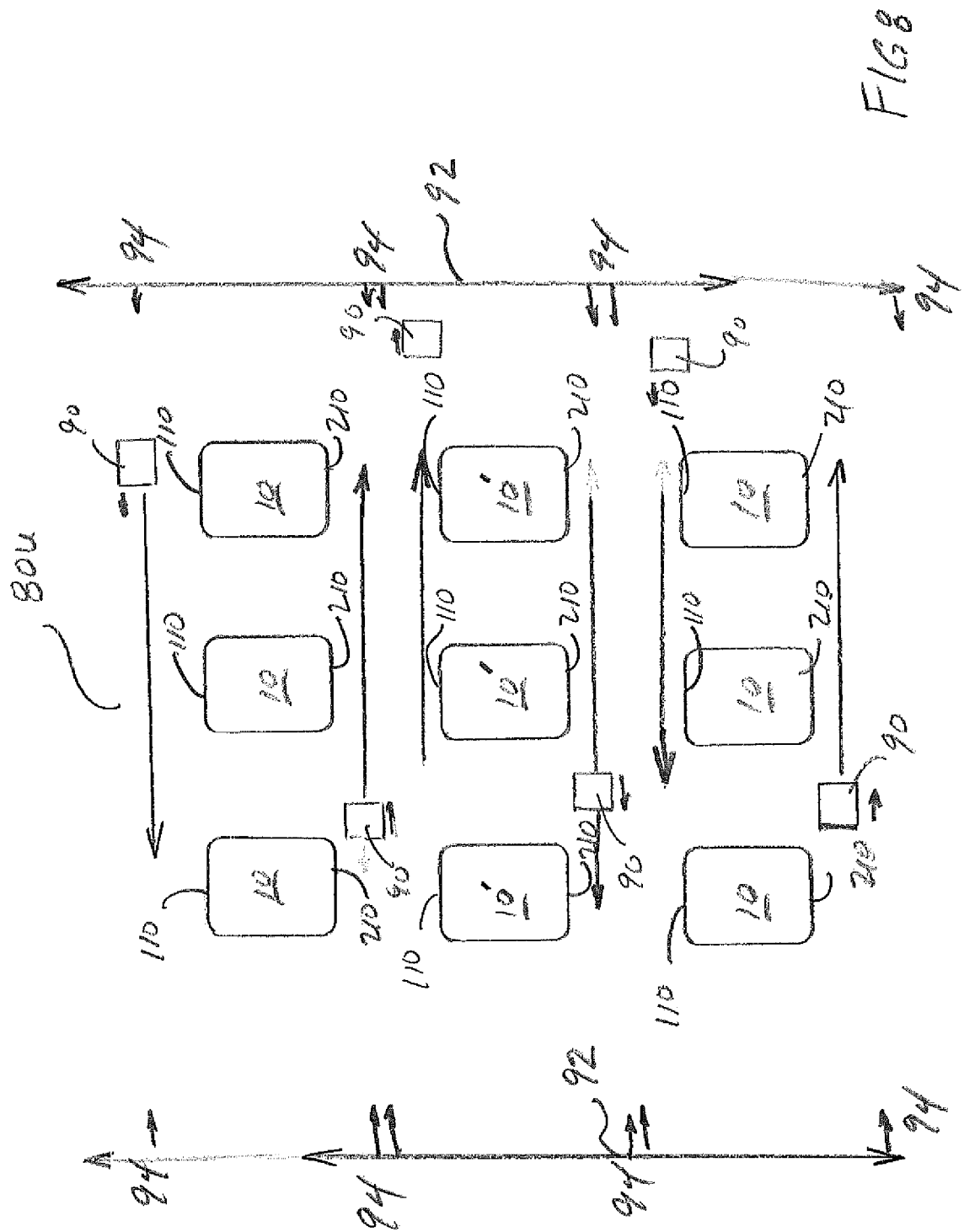
FIG. 8 is a schematic view of an array of chute assemblies on a sort center floor.

Referring to FIG. 8 to illustrate a system of chute assemblies 10 and a method of operation. An array of chute assemblies 10 is organized into a grid having a passageway on opposing sides such that first slide inlet 130 is open to one passageway and the opposing second slide inlet 230 is open to the opposing passageway. Chute assemblies 10 are oriented such that first inlets 130 are oriented to open in a direction facing the approach of transport means 90, which can include a conveyor, a wheeled robot, and/or a carriage, which transport means 90 includes an ejection mechanism to eject a package carried by the transport means 90 while the transport mean 90 is moving. Transport means 90 may also be a person.

The method of conveying packages via conveyors, which conveyors can be of any conventional type suitable for handling packages, that are schematically indicated by arrows 92. Transport means 90 picks up a package at conveyor 92 at induction points indicated by reference number 94. The induction points 94 may be any type of induction point that moves a package onto transport means 90. Transport means 90 has or receives information regarding the package destination, and carries the package to the chute associated with the destination. For example, a scanner may read information on the package indicating its zip code, which is associated with a particular chute and which is transmitted to the transport means.

Transport means 90 travels in one of the directions indicated by the arrows of FIG. 8 until transport means 90 reaches either the first slide inlet 130 or the second slide inlet 230 of the target or intended chute 10. As illustrated in FIG. 8, relative to a row of chute assemblies 10 or 10', the transport means 90 operate in either a clockwise (as illustrated about the middle row of chute assemblies 10') or counterclockwise (as illustrated about the upper and lower row of chute assemblies 10). Thus, the orientation of the chute assembly matches the operating direction (CW or CCW) such that inlets open toward a direction consistent with the package movement. And transport means 90 go the same direction in a single corridor between rows of chute assemblies, which aids in the induction process at induction points 94. Other configurations and orientations are contemplated.

Each chute assembly 10 is oriented such that its front wall 122 or 222 opens toward the oncoming transport means 90. While a transport means 90 is moving along a direction indicated by one of the arrows in FIG. 8, it can be considered to be moving in a tangential direction relative to the chute assembly 10 and vertical axis V. At an appropriate time, the ejection mechanism pushes the package off the transport means and toward or onto the bed 120 or 220 of the chute mechanism 10. In this regard, the package has only a tangential velocity until the ejection mechanism imparts radial movement on package, such that the package entering bed 120 or 220 has a radial (that is relative to vertical axis V) and tangential velocity component. The orientation of front wall 122 or 222 facilitates receiving the package, which slides down bed 120 or 220 and into accumulation conveyor 60 via spiral chute 11.

The present invention is illustrated using the structure and function disclosed. The present invention is not limited to the specific structure and/or function disclosed herein, but rather is entitled to a broad interpretation as stated in the claims and structure and function implied in the disclosure and/or claims. For merely one example, the embodiment of the figures is described as having two inlets slides with packages transported on opposing sides. The present invention is not limited to any quantity of slides, nor to handling packages, nor to receiving item on one level.

What is claimed:

1. A package-handling chute assembly consisting of:
   a first entry slide, a second entry slide, and a spiral chute;
   the first entry slide including an inlet, an outlet, and an inclined bed extending between the inlet and the outlet;
   the second entry slide located opposite the first entry slide; the second entry slide including an inlet, an outlet, and an inclined bed extending between the inlet and the outlet;
   the spiral chute including a first inlet corresponding to the first entry slide outlet, and a second inlet corresponding to the second entry slide outlet; the first chute inlet is located upstream of the second chute inlet; the chute having either a clockwise orientation or a counterclockwise orientation; and
   each one of the first entry slide and the second entry slide open outwardly to receive a package moving in a direction consistent with the chute orientation.

2. The chute assembly of claim 1 wherein the spiral chute is a single helix about a vertical centerline of the spiral chute.

3. The chute assembly of claim 1 wherein the first entry slide is asymmetrical about the first inlet axis and the second entry slide is asymmetrical about the second inlet axis.

4. The chute assembly of claim 1 wherein the chute first inlet defines a first inlet axis and the chute second inlet defines a second inlet axis, and wherein the first inlet axis is parallel to the second inlet axis.

5. The chute assembly of claim 4 wherein the first entry slide includes a front sidewall and a rear sidewall, the rear sidewall corresponding with an outer sidewall of the spiral chute, the front sidewall forming a leading angle with the first inlet axis that is greater than a trailing angle that is formed between the rear sidewall and the first inlet axis.

6. The chute assembly of claim 5 wherein the second entry slide includes a front sidewall and a rear sidewall, the rear sidewall corresponding with an outer sidewall of the spiral chute, the front sidewall forming a leading angle with the second inlet axis that is greater than a trailing angle that is formed between the rear sidewall and the second inlet axis.

7. The chute assembly of claim 6 wherein the front sidewall of the first entry slide and the front sidewall of the second entry slide are defined by the direction of motion of the package.

8. The chute assembly of claim 6 wherein the first entry slide front sidewall and the second entry sidewall are oriented to match the orientation of the chute.

9. The chute assembly of claim 6 wherein the first entry slide is tapered such that the inlet has an opening dimension that is greater than a discharge dimension of the outlet; and the second entry slide is tapered such that the inlet has an opening dimension that is greater than a discharge dimension of the outlet.

10. A method of conveying packages from an upper level to a lower level of a facility, comprising the steps of:
   (a) transporting a first package along a first side a row of chute assemblies of claim 1 on the upper level;
   (b) while the packaging is moving during transporting step (a), moving the package into the first entry slide inlet such that the package has a radial velocity component, a front wall of the first entry slide inlet opening toward the first incoming package direction to facilitate receipt of the package into the first entry slide; the first package then moving down the first entry slide bed and down the spiral chute;
   (c) transporting a second package along a second side of the row of chute assemblies on the upper level; and
   (d) while the packaging is moving during transporting step (c), moving the second package into the second entry slide inlet of one of the chute assemblies such that the second package has a radial velocity component, a front wall of the second entry slide inlet opening toward the second incoming package direction to facilitate receipt of the package into the second entry slide; the second package then moving down the second entry slide bed and down the spiral chute.

11. The method of claim 10 wherein the transporting step (a) and the transporting step (b) are either clockwise or counterclockwise about the row of chute assemblies.

12. The method of claim 11 wherein the spiral chute has a vertical centerline.

13. The method of claim 11 wherein each one of the transporting steps (a) and (c) include transporting by at least one of a conveyor, wheeled robotic transport, a robotic arm, a gantry, and a person.

14. The method of claim 11 further comprising the steps of receiving the first package and the second passage in an accumulation conveyor at an outlet of the spiral chute and grouping the first and second packages together for shipping.

15. The method of claim 14 wherein the first package and the second package have a common destination.

16. The method of claim 11 wherein the moving step (b) includes the front wall of the first entry slide inlet forming a first leading angle with a first inlet axis that is greater than a first trailing angle that is formed between a rear sidewall of the first slide entry and the first inlet axis.

17. The method of claim 16 wherein the moving step (d) includes the front wall of the second entry slide inlet forming a second leading angle with a second inlet axis that is greater than a second trailing angle that is formed between a rear sidewall of the second slide entry and second first inlet axis.

18. A system for conveying packages from an upper level to a lower level of a facility, comprising:
   a first transport means for transporting a first package along a first side of a row of chute assemblies of claim 1 on the upper level;
   a second transport means for transporting a second package along a second side of the row of chute assemblies on the upper level in a direction opposite the direction of the first transport means;
   whereby first entry slide is adapted for receiving the first package and the second entry slide is adapted for receiving the second passage.

19. The system of claim 18 further comprising an accumulation conveyor at an outlet of the spiral chute.

20. The system of claim 18 wherein the transport means consistently move in a clockwise direction or a counterclockwise direction about the row of chute assemblies.

* * * * *